United States Patent
Watanabe et al.

(10) Patent No.: US 8,675,305 B2
(45) Date of Patent: Mar. 18, 2014

(54) BASE UNIT, SPINDLE MOTOR, AND DISK DRIVE APPARATUS

(71) Applicant: Nidec Corporation, Kyoto (JP)

(72) Inventors: Tsuchitsugu Watanabe, Kyoto (JP);
Tomohiro Yokosawa, Kyoto (JP);
Hirofumi Takayama, Kyoto (JP);
Takashi Shimizu, Kyoto (JP); Sho Fukuhara, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/775,493

(22) Filed: Feb. 25, 2013

(65) Prior Publication Data
US 2013/0271871 A1    Oct. 17, 2013

Related U.S. Application Data

(60) Provisional application No. 61/625,132, filed on Apr. 17, 2012.

(30) Foreign Application Priority Data

Apr. 16, 2012    (JP) ................................ 2012-092720

(51) Int. Cl.
*G11B 19/20*    (2006.01)

(52) U.S. Cl.
USPC ...................................................... 360/99.08

(58) Field of Classification Search
USPC ....................................................... 360/99.08
See application file for complete search history.

(56) References Cited

U.S. PATENT DOCUMENTS

| 5,572,381 | A | 11/1996 | Stewart |
| 6,118,198 | A | 9/2000 | Hollenbeck et al. |
| 6,652,324 | B2 | 11/2003 | Maiers et al. |
| 6,771,460 | B2 | 8/2004 | Nii et al. |

(Continued)

FOREIGN PATENT DOCUMENTS

| JP | 07-075275 A | 3/1995 |
| JP | 07-107693 A | 4/1995 |

(Continued)

OTHER PUBLICATIONS

Saichi et al., "Spindle Motor Having Connecting Mechanism Connecting Lead Wire and Circuit Board, and Storage Disk Drive Having the Same", U.S. Appl. No. 13/029,143, filed Feb. 17, 2011.

(Continued)

*Primary Examiner* — Mark Blouin
(74) *Attorney, Agent, or Firm* — Keating & Bennett, LLP

(57) ABSTRACT

A base unit includes a base member and a connector. The base member includes a bottom plate portion, a window portion, and a first groove. The first groove is defined in an upper surface of the bottom plate portion around the window portion. The connector includes a board portion and an electrode terminal. The board portion is arranged on the upper surface of the bottom plate portion to cover the window portion and the first groove. The electrode terminal is arranged to overlap with the window portion in the axial direction. An adhesive is arranged between the upper surface of the bottom plate portion and the lower surface of the board portion. The adhesive is arranged to extend continuously in an annular or substantially annular shape around the window portion while being arranged in at least a portion of the first groove.

18 Claims, 11 Drawing Sheets

(56) References Cited

U.S. PATENT DOCUMENTS

| | | |
|---|---|---|
| 7,012,191 B1 | 3/2006 | Watanabe et al. |
| 7,105,963 B2 | 9/2006 | Ito et al. |
| 7,144,275 B2 | 12/2006 | Iida |
| 7,254,882 B2 | 8/2007 | Ito et al. |
| 7,684,146 B1 | 3/2010 | Andrikowich et al. |
| 7,757,378 B1 | 7/2010 | Mann et al. |
| 8,120,217 B2 | 2/2012 | Yawata et al. |
| 8,120,872 B2 | 2/2012 | Sekii et al. |
| 8,164,851 B2 | 4/2012 | Yoneda et al. |
| 8,299,668 B2 | 10/2012 | Yawata et al. |
| 8,304,945 B2 | 11/2012 | Yawata et al. |
| 8,324,771 B2 | 12/2012 | Yawata et al. |
| 2005/0206255 A1 | 9/2005 | Yoshino et al. |
| 2006/0023339 A1 | 2/2006 | Fukuyama et al. |
| 2006/0281229 A1 | 12/2006 | Koh et al. |
| 2009/0316299 A1 | 12/2009 | Tashiro et al. |
| 2013/0135771 A1* | 5/2013 | Lee et al. .................. 360/99.08 |
| 2013/0163112 A1* | 6/2013 | Jeon, II ............................ 360/75 |

FOREIGN PATENT DOCUMENTS

| | | |
|---|---|---|
| JP | 07-222386 A | 8/1995 |
| JP | 07-334967 A | 12/1995 |
| JP | 11-218128 A | 8/1999 |
| JP | 2000-209804 A | 7/2000 |
| JP | 2001-067775 A | 3/2001 |
| JP | 2005-057892 A | 3/2005 |
| JP | 2006-040423 A | 2/2006 |
| JP | 2009-110611 A | 5/2009 |

OTHER PUBLICATIONS

Sugi et al.,"Motor Unit and Disk Drive Apparatus", U.S. Appl. No. 13/290,209, filed Nov. 7, 2011.

Sugi et al.,"Spindle Motor, and Disk Drive Apparatus Including the Spindle Motor", U.S. Appl. No. 13/334,620, filed Dec. 22, 2011.

Matsuyama et al.,"Spindle Motor, Disk Drive Apparatus, and Method of Manufacturing Spindle Motor", U.S. Appl. No. 13/424,632, filed Mar. 20, 2012.

Watanabe, "Method of Manufacturing Motor, Motor, and Disk Drive Apparatus", U.S. Appl. No. 13/437,103, filed Apr. 2, 2012.

Sugi et al.,"Spindle Motor, Disk Drive Apparatus, and Method of Manufacturing Spindle Motor", U.S. Appl. No. 13/241,773, filed Sep. 23, 2011.

Watanabe et al., "Spindle Motor and Disk Drive Apparatus", U.S. Appl. No. 61/625,128, filed Apr. 17, 2012.

Yawata, "Spindle Motor, Disk Drive Apparatus, and Method of Manufacturing Spindle Motor", U.S. Appl. No. 13/365,286, filed Feb. 3, 2012.

Yawata et al., "Spindle Motor and Storage Disk Drive Apparatus", U.S. Appl. No. 13/662,615, filed Oct. 29, 2012.

Watanabe et al., "Spindle Motor and Disk Drive Apparatus", U.S. Appl. No. 13/775,480, filed Feb. 25, 2013.

* cited by examiner

BASE UNIT, SPINDLE MOTOR, AND DISK DRIVE APPARATUS

BACKGROUND OF THE INVENTION

1. Field of the Invention

The present invention relates to a base unit, a spindle motor, and a disk drive apparatus.

2. Description of the Related Art

Spindle motors arranged to rotate disks are installed in hard disk drives. A conventional hard disk drive and a conventional spindle motor are described, for example, in JP-A 2006-040423. Paragraph [0032] of JP-A 2006-040423 states that the spindle motor (SPM) is fixed to a base of a hard disk drive (HDD). In addition, paragraph [0065] of JP-A 2006-040423 states that a low-density gas having a lower density than that of air, such as He, is used as an atmosphere inside a hard disk assembly (HDA).

A flexible printed circuit board is arranged inside a hard disk drive. The flexible printed circuit board supplies drive currents to a spindle motor. The flexible printed circuit board is connected to an external power supply by a through hole defined in a base. However, a case of the hard disk drive needs to be airtight in order to keep an interior space thereof clean. Therefore, it is required to seal the through hole.

In a conventional hard disk drive, a connector of a flexible printed circuit board is arranged on an upper surface of a base including a through hole to seal the through hole. However, in the case where an interior of the case is filled with the low-density gas, such as He, which tends to easily pass through even a minute gap, as in JP-A 2006-040423, particularly high airtightness is required. Therefore, simply closing the through hole with the connector may fail to prevent a leakage of the low-density gas.

In order to prevent a leakage of the low-density gas out of the case, it is conceivable, for example, to arrange an adhesive between the connector and a periphery of the through hole. However, a variety of electrical wires are arranged around the connector. Electrical connection may be disturbed if the adhesive is brought into contact with these electrical wires and an electrode terminal of the connector.

SUMMARY OF THE INVENTION

An exemplary preferred embodiment of the present invention relates to a base unit for use in a disk drive apparatus. An interior of the disk drive apparatus is filled with helium, hydrogen, a gas mixture of helium and hydrogen, or a gas mixture of any one of the above and air. The base unit includes a base member arranged to support a motor and a connector electrically connected with the motor. The base member includes a bottom plate portion, a window portion, and a first groove. The bottom plate portion is arranged to extend in directions perpendicular or substantially perpendicular to a central axis of the motor. The window portion is arranged to extend in an axial direction through the bottom plate portion. The first groove is defined in an upper surface of the bottom plate portion around the window portion. The connector includes a board portion and an electrode terminal. The board portion is arranged on the upper surface of the bottom plate portion to cover the window portion and the first groove. The electrode terminal is arranged on a lower surface of the board portion. The electrode terminal is arranged to overlap with the window portion in the axial direction. An adhesive is arranged between the upper surface of the bottom plate portion and the lower surface of the board portion. The adhesive is arranged to extend continuously in an annular shape around the window portion. A portion of the adhesive is arranged in at least a portion of the first groove.

According to an exemplary preferred embodiment of the present invention, the adhesive is able to fix the connector to the bottom plate portion. In addition, communication between a space on an upper side of the upper surface of the bottom plate portion and a space on a lower side of a lower surface of the bottom plate portion through the window portion is closed off. Moreover, when the connector is adhered to the base member, a portion of the adhesive is accumulated in the first groove before being cured. This contributes to preventing the adhesive from protruding into the window portion or outwardly from the connector.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, exemplary preferred embodiments of the present invention will be described with reference to the accompanying drawings. It is assumed herein that a direction parallel to a central axis of a spindle motor is referred to as an "axial direction", that directions perpendicular to the central axis of the spindle motor are each referred to as a "radial direction", and that a direction along a circular arc centered on the central axis of the spindle motor is referred to as a "circumferential direction". It is also assumed herein that the axial direction is a vertical direction, and that a side on which a connector is arranged with respect to a bottom plate portion of a base member is an upper side, and the shape of each member or portion and relative positions of different members or portions will be described on the above assumptions. Note, however, that the above definitions of the vertical direction and the upper and lower sides are simply made for the sake of convenience in description, and should not be construed to restrict the orientation of a base unit, a spindle motor, or a disk drive apparatus according to any preferred embodiment of the present invention when in use.

Also note that the wording "parallel direction" as used herein includes parallel or substantially parallel directions. Also note that the wording "perpendicular direction" as used herein includes perpendicular or substantially perpendicular directions.

Figure 1:
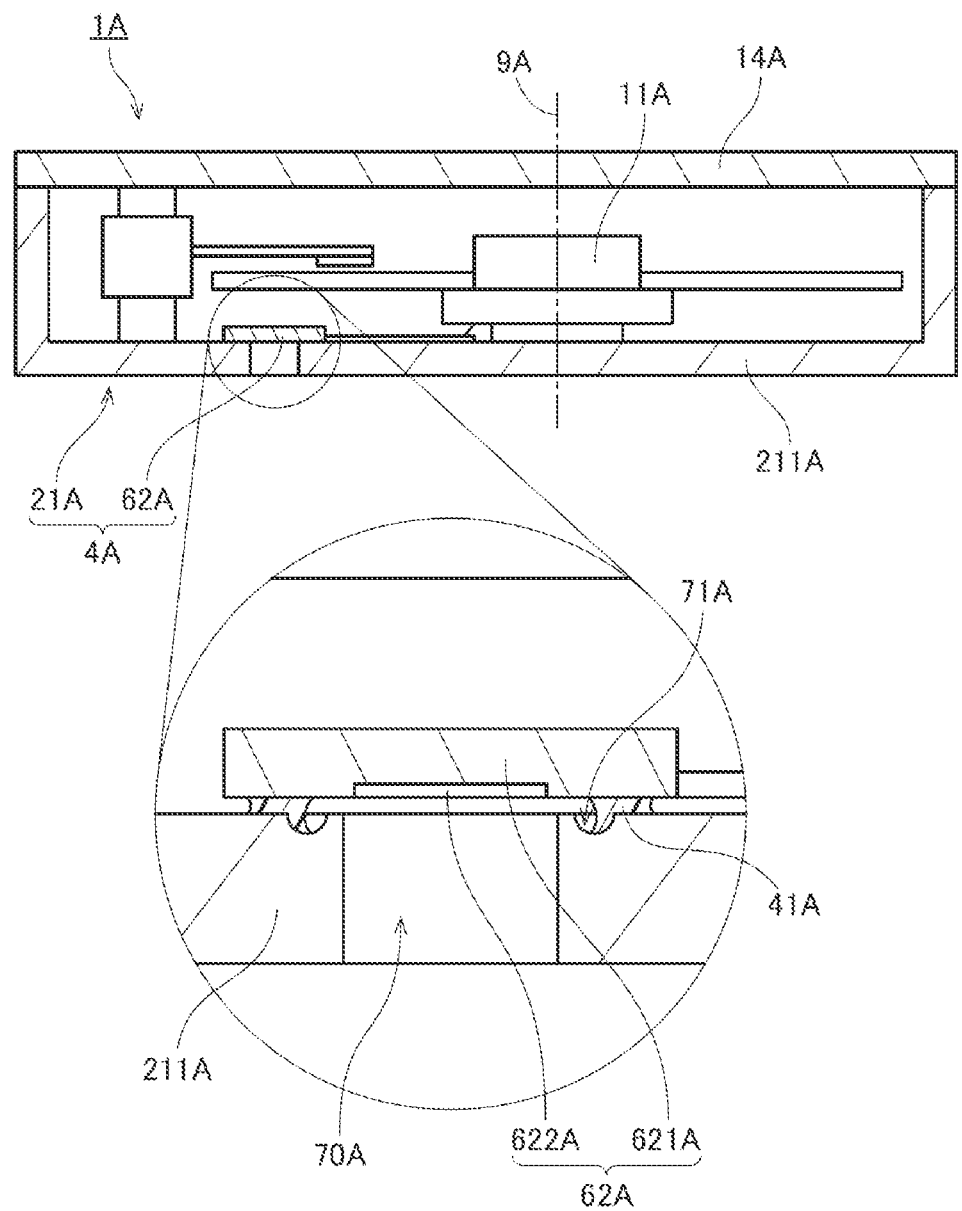
FIG. 1 is a vertical cross-sectional view of a disk drive apparatus according to a preferred embodiment of the present invention.

FIG. 1 is a vertical cross-sectional view of a disk drive apparatus 1A according to a preferred embodiment of the present invention. This disk drive apparatus 1A preferably includes a case including a base member 21A and a cover 14A. An interior of the case is preferably filled with, for example, helium, hydrogen, a gas mixture of helium and hydrogen, or a gas mixture of any one of the above and air. As illustrated in FIG. 1, a base unit 4A is included in the disk drive apparatus 1A. The base unit 4A includes the base member 21A and a connector 62A.

The base member 21A is arranged to support a motor 11A.

In addition, the base member 21A preferably includes a bottom plate portion 211A, a window portion 70A, and a first groove 71A. The bottom plate portion 211A is arranged to extend in directions perpendicular to a central axis 9A of the motor 11A. The window portion 70A is arranged to extend in an axial direction through the bottom plate portion 211A. The first groove 71A is arranged in an upper surface of the bottom plate portion 211A around the window portion 70A.

The connector 62A is electrically connected with the motor 11A. In addition, the connector 62A preferably includes a board portion 621A and an electrode terminal 622A. The board portion 621A is arranged on the upper surface of the bottom plate portion 211A. In addition, the board portion 621A is arranged to cover the window portion 70A and the first groove 71A. The electrode terminal 622A is arranged on a lower surface of the board portion 621A.

As illustrated in an enlarged form in FIG. 1, the electrode terminal 622A is arranged to overlap with the window portion 70A in the axial direction. In addition, an adhesive 41A is preferably arranged between the upper surface of the bottom plate portion 211A and the lower surface of the board portion 621A such that the bottom plate portion 211A is fixed to the board portion 621A. In addition, the adhesive 41A is arranged to extend continuously in an annular shape around the window portion 70A. This closes off communication between the interior and an exterior of the case through the window portion 70A. That is, the adhesive 41A plays both a role of fixing the board portion 621A to the bottom plate portion 211A, and a role of closing off the communication between the interior and exterior of the case through the window portion 70A.

In addition, when the connector 62A is adhered to the base member 21A, a portion of the adhesive 41A is preferably arranged in the first groove 71A before being cured. As a result, a portion of the adhesive 41A is arranged in at least a portion of the first groove 71A. This contributes to preventing at least a portion of the adhesive 41A from protruding into the window portion 70A or outwardly of the connector 62A.

Figure 2:
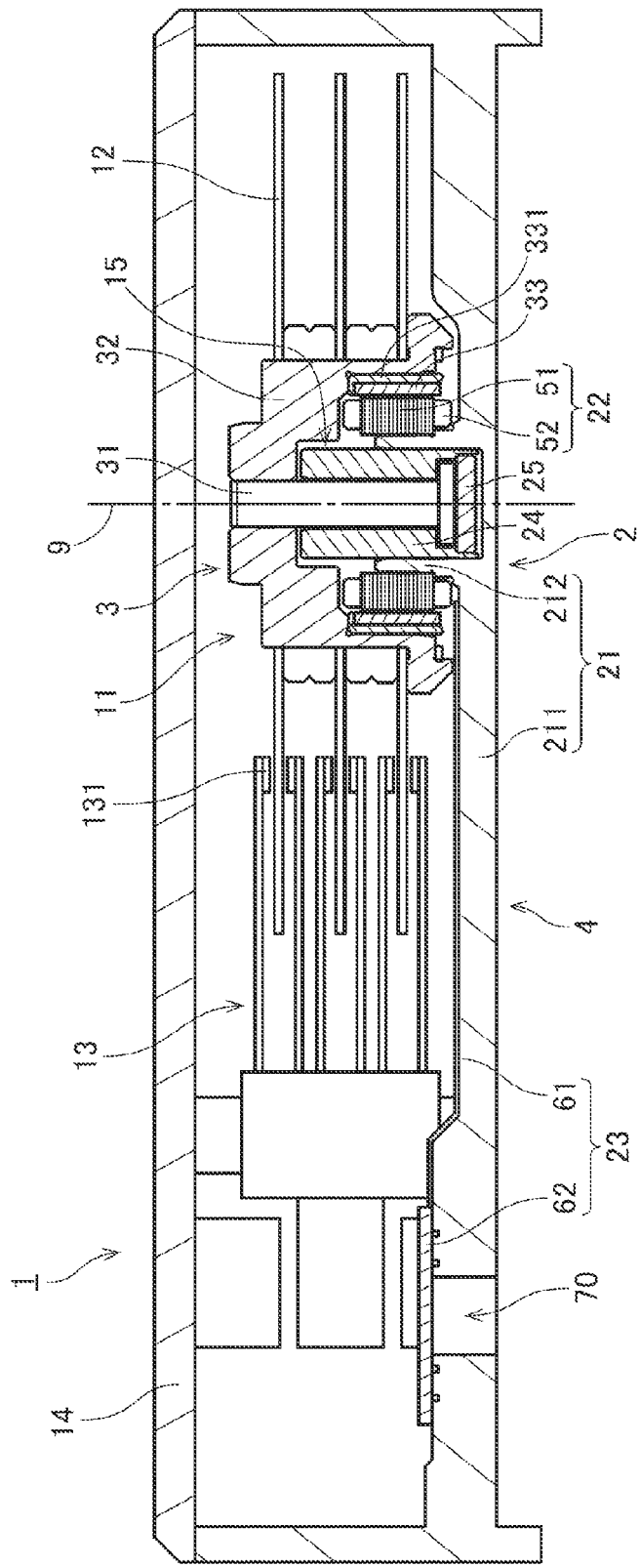
FIG. 2 is a vertical cross-sectional view of a disk drive apparatus according to a preferred embodiment of the present invention.

FIG. 2 is a vertical cross-sectional view of a disk drive apparatus 1 according to a more specific preferred embodiment of the present invention. The disk drive apparatus 1 is arranged to perform at least one of "reading" and "writing" of information from or to magnetic disks 12 while rotating the magnetic disks 12. As illustrated in FIG. 2, the disk drive apparatus 1 preferably includes a spindle motor 11, at least one magnetic disk 12, an access portion 13, and a cover 14.

The spindle motor 11 is arranged to rotate the at least one magnetic disk 12 about a central axis 9 while supporting the magnetic disk(s) 12. In this preferred embodiment, the number of magnetic disks 12 is preferably three, for example. The disk drive apparatus 1 includes a base member 21 arranged to support the spindle motor 11. A case includes the base member 21 and the cover 14. A rotating portion 3 of the spindle motor 11, the at least one magnetic disk 12, and the access portion 13 are accommodated inside the case. The access portion 13 is arranged to move a head 131 along a recording surface of each magnetic disk 12 to perform at least one of the "reading" and the "writing" of information from or to the magnetic disk 12.

A junction between the base member 21 and the cover 14 is preferably sealed with a sealant, such as, for example, an elastomer. An interior of the case is filled preferably with, for example, helium, hydrogen, a gas mixture of helium and hydrogen, or a gas mixture of any one of the above and air. Thus, resistance of the gas against the access portion 13 is reduced. Moreover, a viscous drag which is applied to each magnetic disk during rotation of the magnetic disks 12 is thus reduced.

Note that the number of magnetic disks 12 included in the disk drive apparatus 1 may alternatively be any of one, two, or more than three, for example. No particular limitation is imposed on the number of magnetic disks 12 included in the disk drive apparatus 1. Also note that the access portion 13 may be arranged to perform only one of the reading and the writing of information from or to the magnetic disk(s) 12 if so desired.

Next, the structure of the above-described spindle motor 11 will now be described below. As illustrated in FIG. 2, the spindle motor 11 includes a stationary portion 2 and the rotating portion 3. The stationary portion 2 is stationary relative to each of the base member 21 and the cover 14. The rotating portion 3 is supported to be rotatable with respect to the stationary portion 2.

The stationary portion 2 according to the present preferred embodiment preferably includes the base member 21, an armature 22, an electrical wiring portion 23, a sleeve 24, and a cap 25.

The base member 21 is arranged to support the armature 22 and the sleeve 24. The base member 21 is preferably a metallic member. The base member 21 is preferably molded by subjecting an aluminum alloy to a casting process, for example. As illustrated in FIG. 2, the base member 21 includes a bottom plate portion 211 and a cup portion 212 including a bottom and being cylindrical or substantially cylindrical. The bottom plate portion 211 is arranged to extend in directions perpendicular to the central axis 9 on a lower side of the rotating portion 3, the magnetic disks 12, and the access portion 13. The cup portion 212 is arranged to be concentric or substantially concentric with the central axis 9.

The armature 22 preferably includes a stator core 51 and a plurality of coils 52. The stator core 51 is preferably defined by laminated steel sheets, i.e., a plurality of electromagnetic steel sheets placed one upon another in the axial direction, for example. A silicon steel sheet, for example, is preferably used as each electromagnetic steel sheet. The stator core 51 is fixed to an outer circumferential surface of the cup portion 212. In addition, the stator core 51 includes a plurality of teeth arranged to project radially outward. Each coil 52 is defined by a conducting wire wound around a separate one of the teeth.

The electrical wiring portion 23 is arranged on an upper surface of the bottom plate portion 211, and is electrically connected with the coils 52. The electrical wiring portion 23 preferably includes a flexible printed circuit board 61 and a connector 62. Drive currents supplied from an external power supply are supplied to the coils 52 through the connector 62 and the flexible printed circuit board 61. In the present preferred embodiment, a base unit 4 includes the base member 21 and the electrical wiring portion 23. The structure of the base unit 4 will be described in more detail below.

The sleeve 24 is arranged to extend in the axial direction around a shaft 31 described below to substantially assume the shape of a cylinder. A lower portion of the sleeve 24 is accommodated in the cup portion 212. The lower portion of the sleeve 24 is fixed to the cup portion 212 through, for example, an adhesive or the like. An inner circumferential surface of the sleeve 24 is arranged radially opposite an outer circumferential surface of the shaft 31. In addition, a lower opening of the sleeve 24 is closed by the cap 25.

The rotating portion 3 according to the present preferred embodiment preferably includes the shaft 31, a hub 32, and a magnet 33.

The shaft 31 is arranged to extend in the axial direction on a radially inner side of the sleeve 24. A metal such as stainless steel, for example, is preferably used as a material of the shaft 31. An upper end portion of the shaft 31 is arranged to project upwardly of an upper surface of the sleeve 24. In addition, a lubricating fluid is preferably arranged between the shaft 31 and a combination of the sleeve 24 and the cap 25. The shaft 31 is supported to be rotatable with respect to the sleeve 24 and the cap 25 through the lubricating fluid.

Each of the sleeve 24 and the cap 25 is a member of the stationary portion 2. The shaft 31 is a member of the rotating portion 3. That is, in the present preferred embodiment, the sleeve 24, the cap 25, the shaft 31, and the lubricating fluid, which is arranged therebetween, are preferably arranged to together define a bearing mechanism 15. The rotating portion 3 is rotatably supported by the bearing mechanism 15. A polyolester oil or a diester oil, for example, is preferably used as the lubricating fluid. The bearing mechanism 15 is fixed to the base unit 4.

The hub 32 is arranged to extend radially outward and downward from a periphery of the upper end portion of the shaft 31. An inner circumferential portion of the hub 32 is fixed to the upper end portion of the shaft 31. Each magnetic disk 12 is supported by the hub 32. In addition, the magnet 33 is preferably fixed to the hub 32 through a back yoke 331, which is a magnetic body. A radially inner surface of the magnet 33 is arranged radially opposite the plurality of teeth of the stator core 51. In addition, north and south poles are arranged alternately in a circumferential direction on the radially inner surface of the magnet 33.

In the spindle motor 11 described above, once the drive currents are supplied to the coils 52, magnetic flux is generated around each of the teeth of the stator core 51.

Then, interaction between the magnetic flux of the teeth and the magnetic flux of the magnet 33 produces a circumferential torque, so that the rotating portion 3 is caused to rotate about the central axis 9 with respect to the stationary portion 2. The magnetic disks 12 supported by the hub 32 are caused to rotate about the central axis 9 together with the rotating portion 3.

Next, the structure of the base unit 4 will now be described in more detail below.

Figure 3:
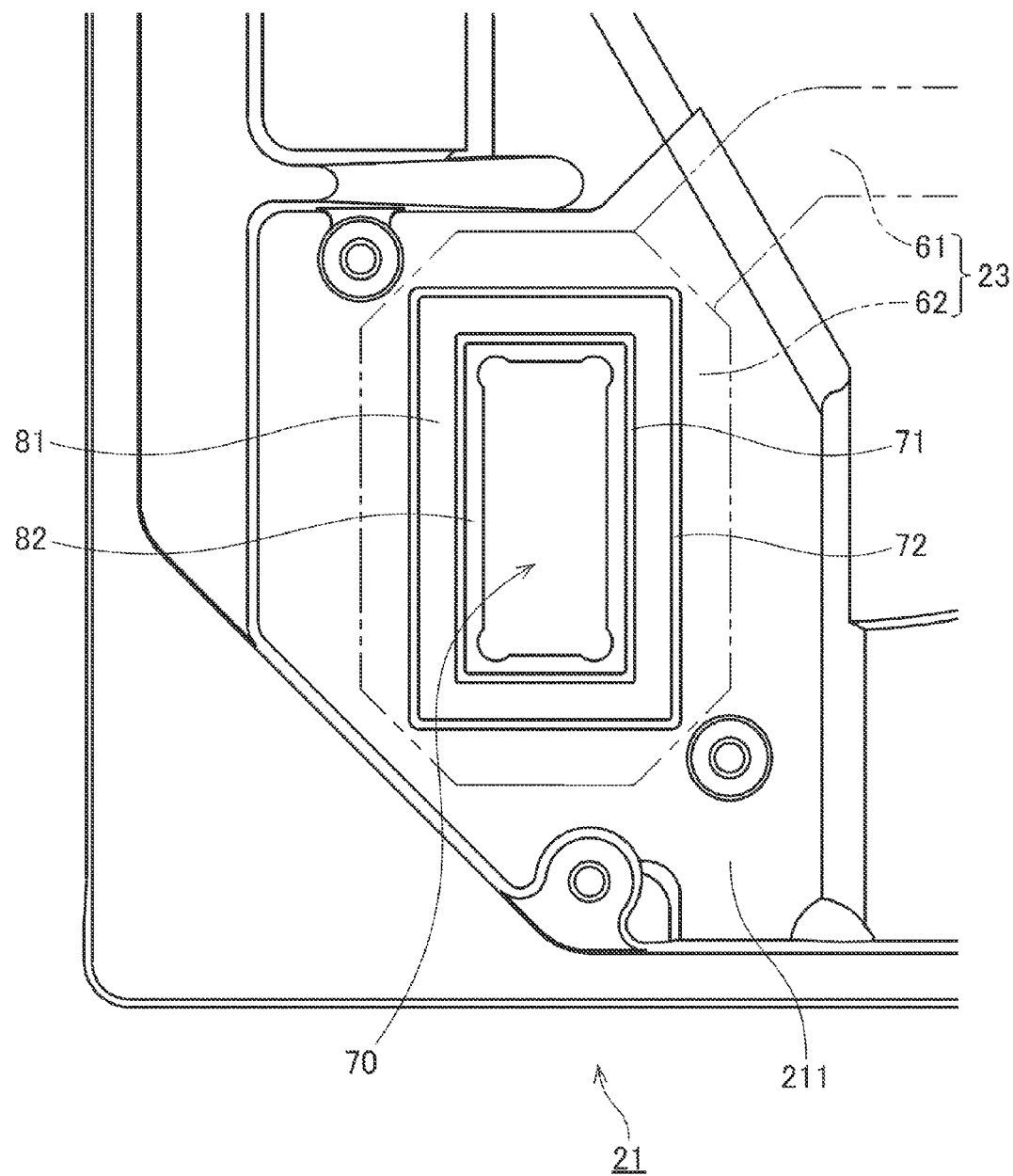
FIG. 3 is a partial top view of a base member according to a preferred embodiment of the present invention.

FIG. 3 is a partial top view of the base member 21. In FIG. 3, the electrical wiring portion 23 is represented by a chain double-dashed line. As illustrated in FIG. 3, the base member 21 includes a window portion 70. The window portion 70 is a through hole extending in the axial direction through the bottom plate portion 211. In addition, the base member 21 preferably includes, around the window portion 70, a first groove 71, a second groove 72, a first base upper surface 81, and a second base upper surface 82.

The first groove 71 and the second groove 72 are arranged in an upper surface of the bottom plate portion 211. Each of the first groove 71 and the second groove 72 according to the present preferred embodiment is preferably an annular groove. The first groove 71 is arranged to surround the window portion 70. The second groove 72 is arranged to surround the window portion 70 and the first groove 71. That is, the second groove 72 is arranged on the outer side of the first groove 71 with respect to the window portion 70.

The first base upper surface 81 is arranged to extend in an annular shape between the first groove 71 and the second groove 72. That is, the first base upper surface 81 is arranged to extend further outward from an edge portion of the first groove 71 on the outer side with respect to the window portion 70 to an edge portion of the second groove 71 on a side closer to the window portion 70. The second groove 72 is arranged on the outer side of the first base upper surface 81 with respect to the window portion 70. The second base upper surface 82 is arranged to extend in an annular shape between the window portion 70 and the first groove 71. That is, the second base upper surface 82 is arranged to extend from an edge portion of the window portion 70 outward with respect to the window portion 70 to an edge portion of the first groove 71 on the side closer to the window portion 70.

Figure 4:
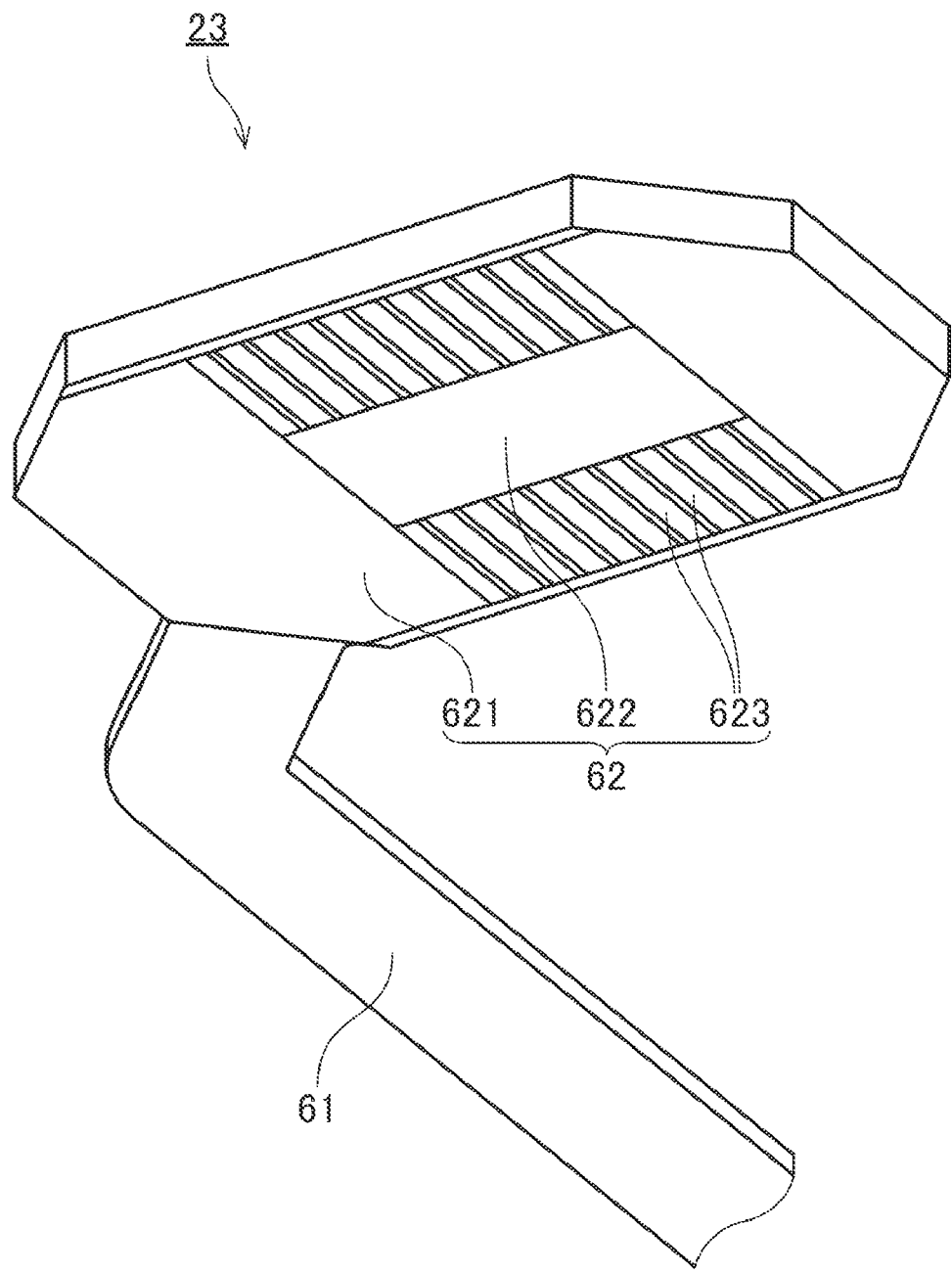
FIG. 4 is a partial perspective view of an electrical wiring portion according to a preferred embodiment of the present invention.

FIG. 4 is a partial perspective view of the electrical wiring portion 23. As illustrated in FIG. 4, the connector 62 of the electrical wiring portion 23 preferably includes a board portion 621 and an electrode terminal 622. The axial thickness and rigidity of the board portion 621 are preferably greater than the axial thickness and rigidity, respectively, of the flexible printed circuit board 61. An end portion of a lead wire extending from a power supply unit is connected to the electrode terminal 622. The electrode terminal 622 is arranged on a lower surface of the board portion 621. In addition, a plurality of third grooves 623 are preferably arranged in the lower surface of the board portion 621. The third grooves 623 are arranged to extend from an edge portion of the electrode terminal 622 toward an edge portion of the board portion 621 in parallel with each other.

Figure 5:
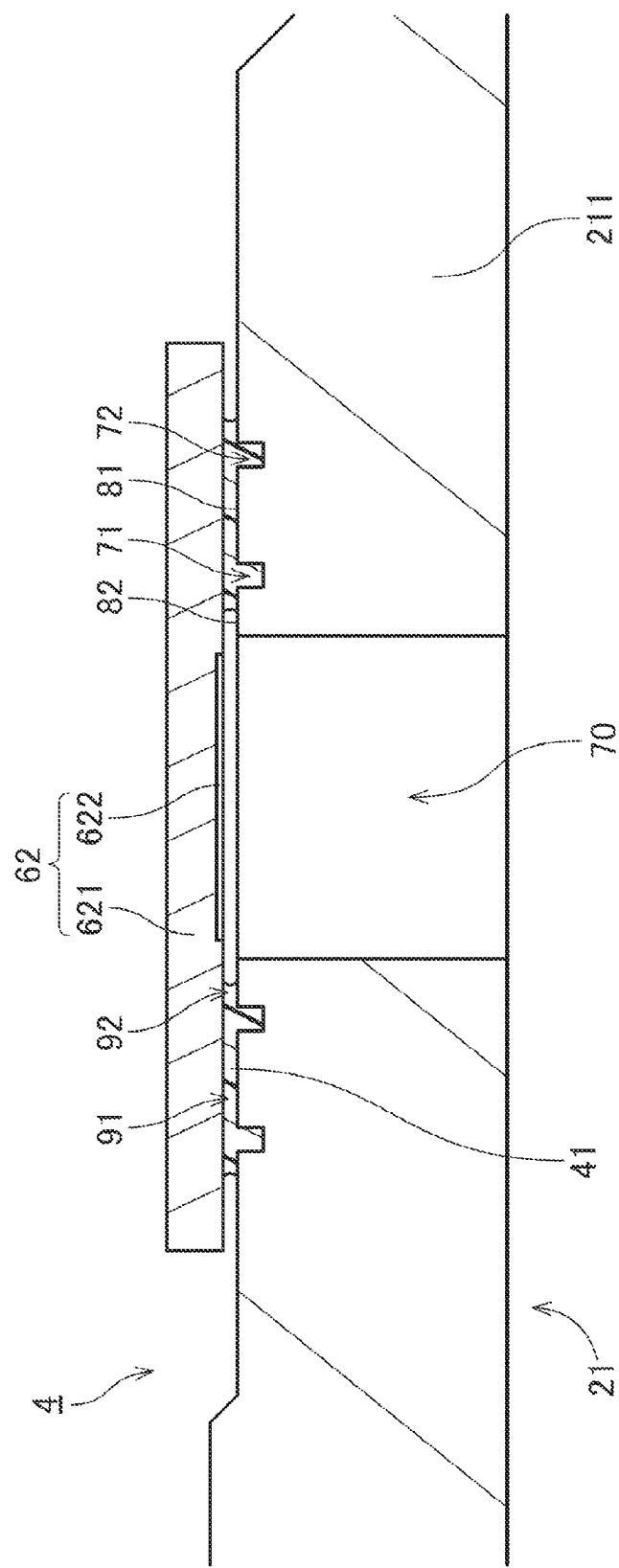
FIG. 5 is a partial vertical cross-sectional view of a base unit according to a preferred embodiment of the present invention.

FIG. 5 is a partial vertical cross-sectional view of the base unit 4. As illustrated in FIGS. 3 and 5, the board portion 621 of the connector 62 is arranged on the upper surface of the bottom plate portion 211. Each of the window portion 70, the first groove 71, and the second groove 72 is preferably covered with the board portion 621. In addition, as illustrated in FIG. 5, a space corresponding to the window portion 70 overlaps with the electrode terminal 622 in the axial direction. The electrode terminal 622 is thus exposed, facing a space on a lower side of a lower surface of the base member 21. This enables the power supply unit, which is arranged in an outside of the disk drive apparatus 1, to be electrically connected to the electrode terminal 622 of the connector 62 through the lead wire.

In addition, as illustrated in FIG. 5, an adhesive 41 is arranged between the upper surface of the bottom plate portion 211 and the lower surface of the board portion 621. A first gap 91 is a gap defined between the lower surface of the board portion 621 and the first base upper surface 81. A second gap 92 is a gap defined between the second base upper surface 82 and the lower surface of the board portion 621. In the present preferred embodiment, the adhesive 41 is preferably arranged in each of the first gap 91 and the second gap 92. The bottom plate portion 211 is fixed to the board portion 621 through the adhesive 41. An epoxy resin adhesive, for example, is used as the adhesive 41.

In addition, the adhesive 41 is preferably arranged to extend continuously in an annular shape around the window portion 70. The adhesive 41 thus closes off communication between a space on an upper side of the upper surface of the bottom plate portion 211 and a space on a lower side of a lower surface of the bottom plate portion 211 through the window portion 70. In other words, arrangement of the adhesive 41 closes off communication between the interior and an exterior of the case through the window portion 70. As a result, an interior space of the case defined by the base member 21 and the cover 14 is preferably kept airtight.

The gas, such as, for example, helium, is prevented from leaking out of the case.

That is, the adhesive 41 according to the present preferred embodiment plays both a role of fixing the board portion 621 to the bottom plate portion 211, and a role of sealing off the window portion 70.

Figure 6:
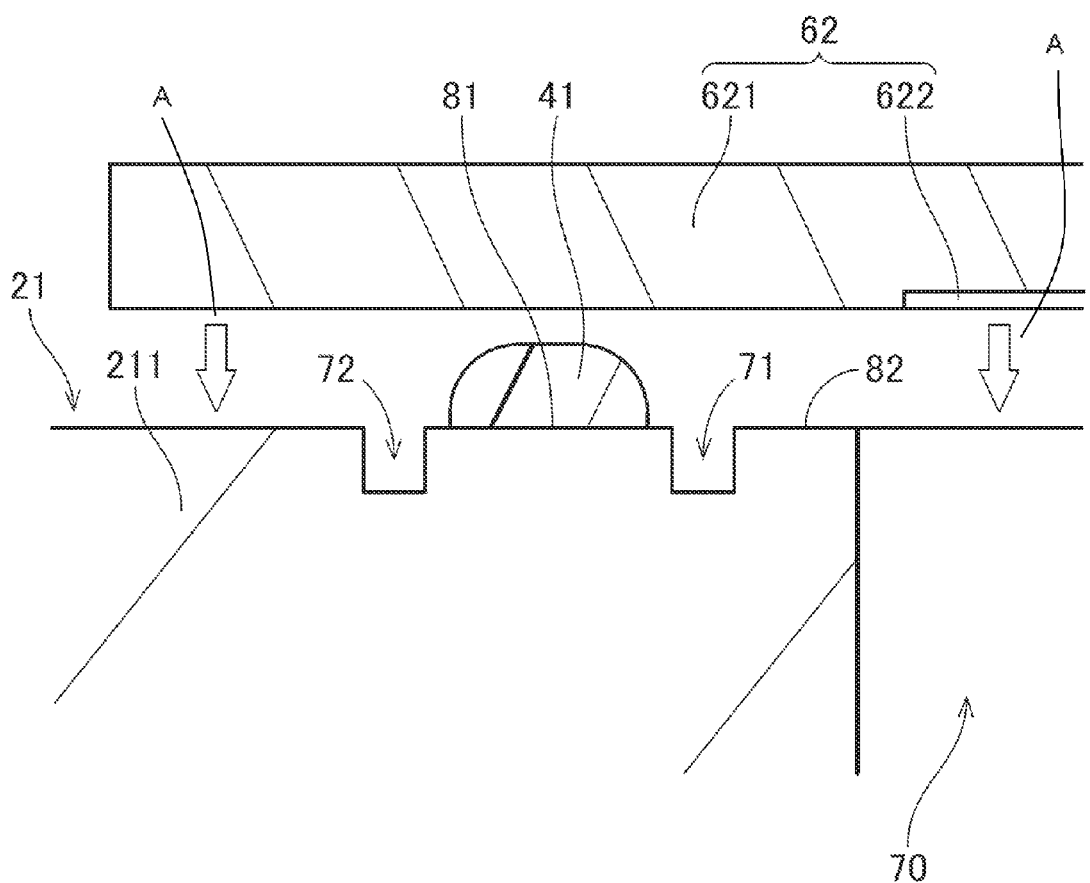
FIG. 6 is a vertical cross-sectional view illustrating a manner of adhesion according to a preferred embodiment of the present invention.
Figure 7:
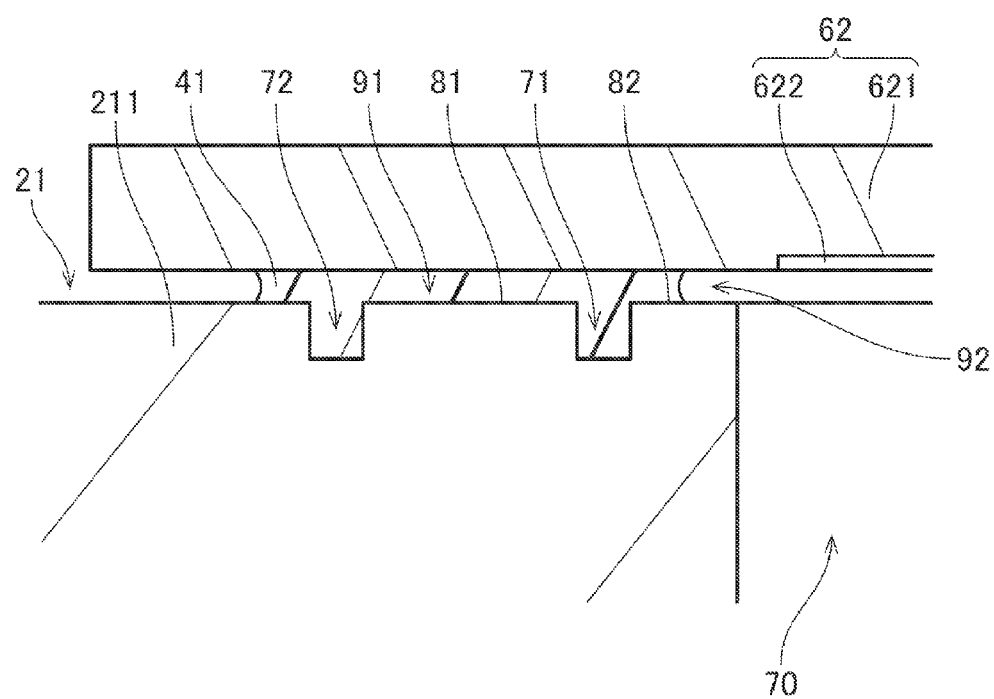
FIG. 7 is a vertical cross-sectional view illustrating the manner of adhesion according to a preferred embodiment of the present invention.

FIGS. 6 and 7 are each a vertical cross-sectional view illustrating how the board portion 621 is adhered to the bottom plate portion 211 in accordance with a preferred embodiment of the present invention. When the board portion 621 is adhered to the bottom plate portion 211, the adhesive 41 is first applied to the first base upper surface 81 such that the adhesive 41 assumes an annular shape as illustrated in FIG. 6. The adhesive 41 applied here has a volume greater than that of the first gap 91 after manufacture. Next, as indicated by two arrows A in FIG. 6, the connector 62 is brought closer to the upper surface of the bottom plate portion 211. As a result, the board portion 621 is fixed to the bottom plate portion 211 through the adhesive 41 as illustrated in FIG. 7.

At this time, when the connector 62 is brought into proximity with the upper surface of the bottom plate portion 211, the adhesive 41 is spread between the upper surface of the bottom plate portion 211 and the lower surface of the board portion 621. Note, however, that a portion of the spread adhesive 41 is preferably arranged in at least a portion of the first groove 71. That is, the adhesive 41 is arranged to spread out over both the first gap 91 and an inside of the first groove 71. The adhesive is thus prevented from spreading toward the window portion 70. As a result, the adhesive 41 is prevented from protruding into the window portion 70. In particular, in the present preferred embodiment, the first groove 71 is preferably arranged to extend continuously in an annular shape around the window portion 70 as illustrated in FIG. 3. The adhesive 41 is accordingly prevented from protruding into the window portion 70 at any position along the circumference thereof.

In addition, another portion of the adhesive 41 is arranged in at least a portion of the second groove 72. That is, the adhesive 41 is preferably arranged to spread over both the first gap 91 and an inside of the second groove 72. The adhesive 41 is thus prevented from spreading toward an edge portion of the connector 62. As a result, the adhesive 41 is prevented from protruding outwardly of the connector 62. In particular, in the present preferred embodiment, the second groove 72 is arranged to extend continuously in an annular shape around the first base upper surface 81 as illustrated in FIG. 3. The adhesive 41 is accordingly prevented from protruding outwardly of the connector 62 at any position along the circumference thereof.

Moreover, as illustrated in FIG. 7, in the present preferred embodiment, the adhesive 41 spreads not only in the first gap 91, the inside of the first groove 71, and the inside of the second groove 72, but also in the second gap 92. This causes the board portion 621 to be fixed to the base member 21 more securely. Further, this contributes to more effectively preventing communication between the interior and exterior of the case through the window portion 70. In particular, in the present preferred embodiment, the second gap 92 is arranged to have a constant or substantially constant axial dimension between the first groove 71 and the window portion 70. Accordingly, the adhesive 41 is easily brought into contact with both the second base upper surface 82 and the lower surface of the board portion 621. Thus, the board portion 621 is more securely fixed to the base member 21. Moreover, the communication between the interior and exterior of the case through the window portion 70 is closed off more securely.

It is desirable that a gas which is present between the bottom plate portion 211 and the board portion 621 should be discharged into the window portion 70 or outwardly of the connector 62 when the board portion 621 is adhered to the bottom plate portion 211. In view of this consideration, according to the present preferred embodiment, the third grooves 623 (see FIG. 4) are preferably arranged in the lower surface of the board portion 621. The third grooves 623 are each preferably arranged to extend in a direction perpendicular to both the first groove 71 and the second groove 72. This enables the gas which is present between the bottom plate portion 211 and the board portion 621 to be discharged along the third grooves 623 into the window portion 70 or outwardly of the connector 62 when the board portion 621 is adhered to the bottom plate portion 211. This preferably leads to stronger adhesion of the adhesive 41 to each of the bottom plate portion 211 and the board portion 621.

While exemplary preferred embodiments of the present invention have been described above, the present invention is not limited to the above-described preferred embodiments.

Each of the first groove and the second groove may be rectangular or substantially rectangular in a cross-section perpendicular to the groove as illustrated in FIGS. 5, 6, and 7, or may be in another shape. For example, each of the first groove and the second groove may alternatively be arranged in the shape of the letter "V", substantially in the shape of a circular arc, or in the shape of a polygon other than the rectangle in the cross-section perpendicular to the groove.

Also note that the outside shape of the window portion may be quadrangular or substantially quadrangular in a plan view as illustrated in FIG. 3, or may be in another shape. For example, the outside shape of the window portion may alternatively be any of a circle, an ellipse, a triangle, a polygon, etc., in the plan view. Also note that each of the first groove and the second groove may be in the shape of a quadrilateral or substantially in the shape of a quadrilateral as illustrated in FIG. 3 in a plan view, or may be in another shape. For example, each of the first groove and the second groove may alternatively be in the shape of a circle or a triangle in the plan view. Also note that each of the first groove and the second groove may not necessarily be in an annular shape.

Figure 8:
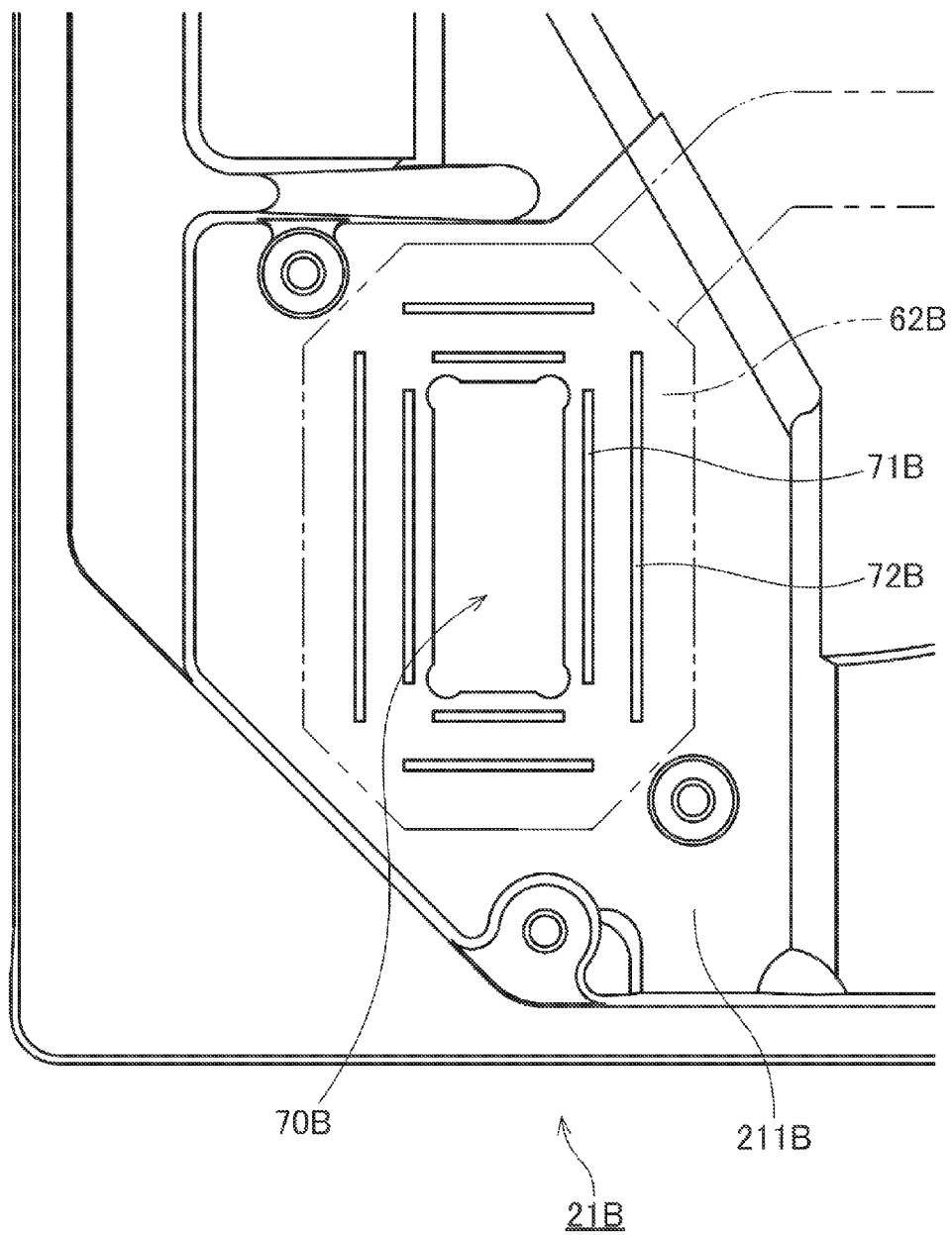
FIG. 8 is a partial top view of a base member according to an example modification of a preferred embodiment of the present invention.

FIG. 8 is a partial top view of a base member 21B according to an example modification of a preferred embodiment of the present invention. In FIG. 8, a plurality of first grooves 71B are arranged around a window portion 70B such that the first grooves 71B are spaced from one another. The first grooves 71B are arranged to surround the window portion 70B with at least one space intervening therebetween. A plurality of second grooves 72B are arranged such that the second grooves 72B are spaced from one another. The second grooves 72B are arranged to surround the window portion 70B with at least one space intervening therebetween. That is, the first grooves 71B are not arranged to extend continuously in an annular shape.

The second grooves 72B are not arranged to extend continuously in an annular shape. A portion of an upper surface of a bottom plate portion 211B where neither the first groove 71B nor the second groove 72B is arranged is thus widened around the window portion 70B. This enables a connector 62B to be fixed to the base member 21B more securely.

Figure 9:
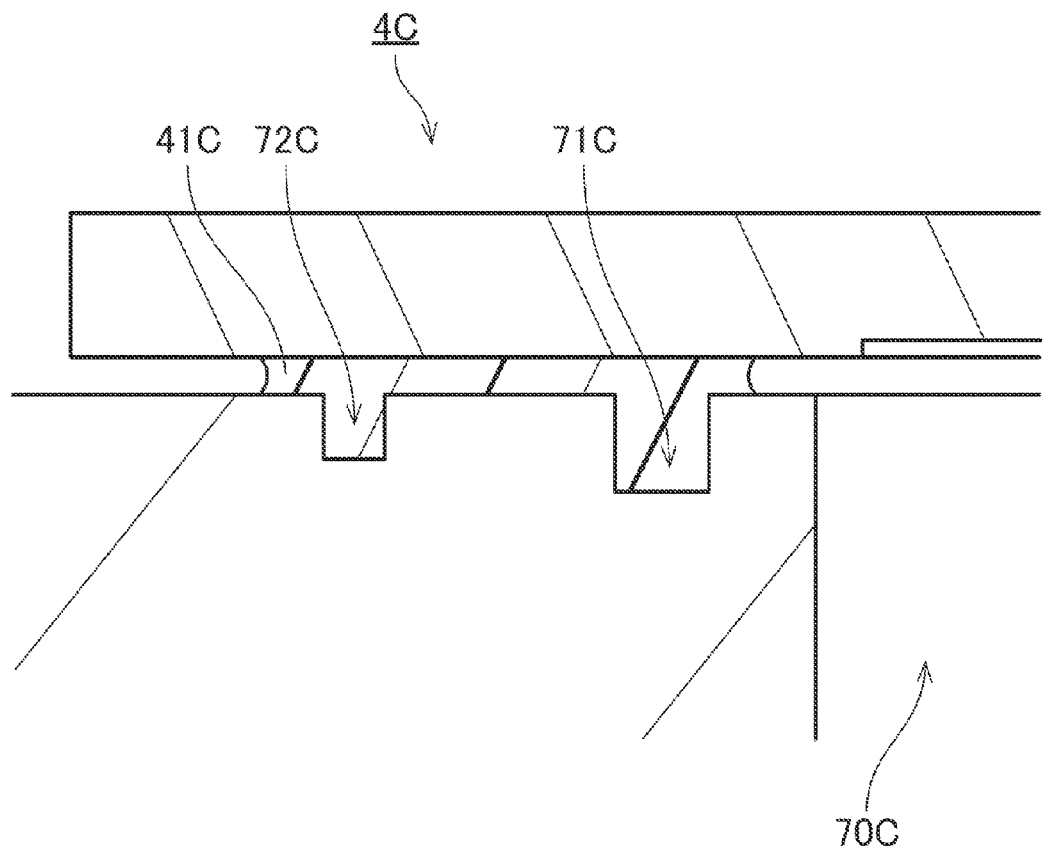
FIG. 9 is a partial vertical cross-sectional view of a base unit according to an example modification of a preferred embodiment of the present invention.

Referring to FIG. 7, in the above-described preferred embodiment, the width of the first groove 71 is equal or substantially equal to the width of the second groove 72. In addition, the depth of the first groove 71 is equal or substantially equal to the depth of the second groove 72. In this case, the position of the first groove 71 is preferably closer to the window portion 70 than is the second groove 72 in a plan view. Therefore, the length of the first groove 71 surrounding the window portion 70B is shorter than the length of the second groove 72 surrounding the window portion 70B in the plan view. Therefore, the volume of the first groove 71 is smaller than the volume of the second groove 72. In order to decrease a difference between these volumes, the width and depth of a first groove 71C may be arranged to be greater than the width and depth, respectively, of a second groove 72C as in a base unit 4C illustrated in FIG. 9, for example. This contributes to more effectively preventing an adhesive 41C from protruding into a window portion 70C. Note that only the width of the first groove 71C may be arranged to be greater than the width of the second groove 72C. Also note that only the depth of the first groove 71C may be arranged to be greater than the depth of the second groove 72C. Also, only the width of the first groove may be arranged to be greater than the width of the second groove, or only the depth of the first groove may be arranged to be greater than the depth of the second groove.

Figure 10:
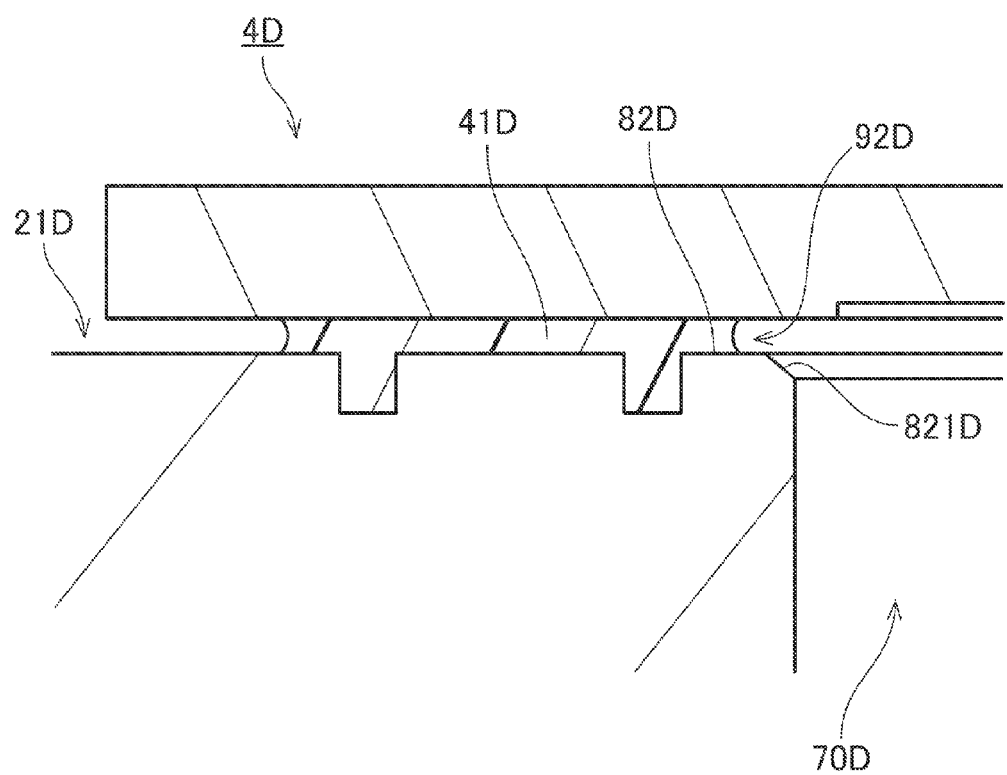
FIG. 10 is a partial vertical cross-sectional view of a base unit according to an example modification of a preferred embodiment of the present invention.

FIG. 10 is a partial vertical cross-sectional view of a base unit 4D according to another example modification of a preferred embodiment of the present invention. In FIG. 10, a base member 21D preferably includes an inclined surface 821D. The inclined surface 821D is arranged in the vicinity of an end portion of a second base upper surface 82D on a side closer to a window portion 70D. The inclined surface 821D is arranged to gradually descend with decreasing distance from the window portion 70D. The axial dimension of a second gap 92D is thus arranged to gradually increase with decreasing distance from the window portion 70D in the vicinity of an end portion of the second gap 92D on the side closer to the window portion 70D. Thus, even if an adhesive 41D is spread closer to the window portion 70D, the adhesive 41D will be held by surface tension in the vicinity of the end portion of the second gap 92D on the side closer to the window portion 70D. This preferably contributes to more effectively preventing the adhesive 41D from protruding into the window portion 70D.

Note that the inclined surface may be arranged in only one of the second base upper surface and the lower surface of the board portion. In the case where the inclined surface is arranged in the lower surface of the board portion, the inclined surface is arranged to gradually rise with decreasing distance from the window portion 70. It is sufficient if the inclined surface causes the axial dimension of the second gap to gradually increase with decreasing distance from the window portion in the vicinity of the end portion of the second gap on the side closer to the window portion. Note, however, that the axial thickness of the connector is smaller than the axial thickness of the bottom plate portion. Therefore, it is easier to define the inclined surface in the bottom plate portion than in the connector. Also note that the inclined surface may be arranged in an annular or substantially annular shape to surround the window portion in at least one of the second base upper surface and the lower surface of the board portion. Alternatively, a plurality of inclined surfaces may be arranged to surround the window portion with one or more spaces intervening therebetween in at least one of the second base upper surface and the lower surface of the board portion. Also note that a curved surface or the like may be provided to cause the axial dimension of the second gap to gradually increase with decreasing distance from the window portion in the vicinity of the end portion of the second gap on the side closer to the window portion.

Figure 11:
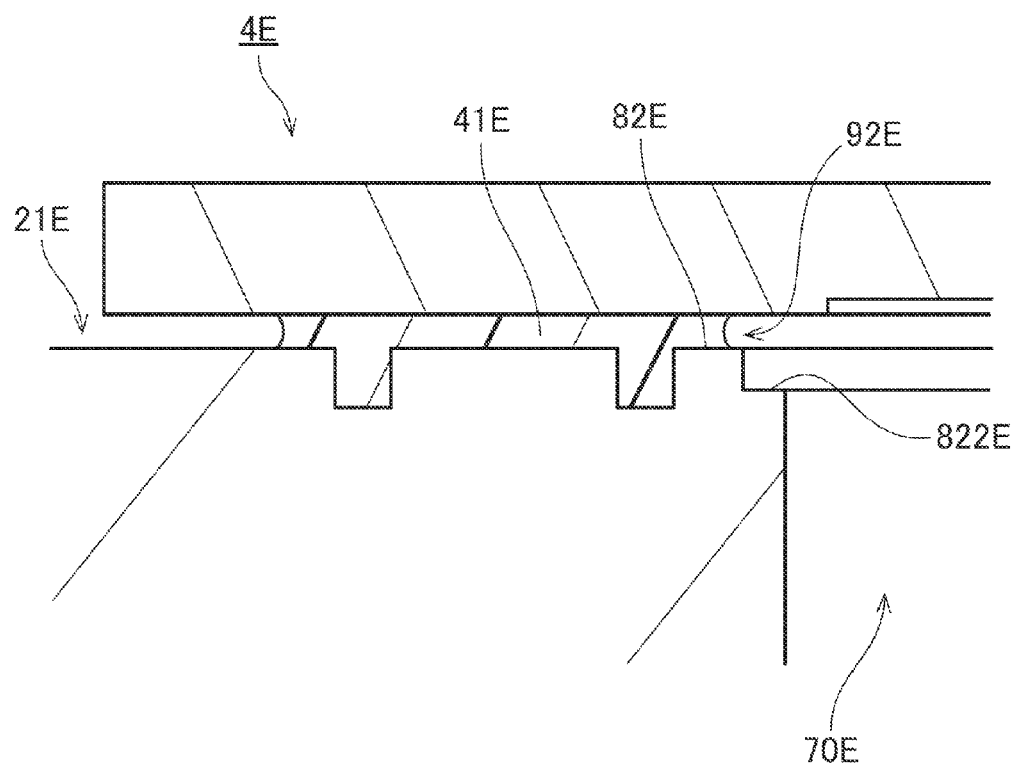
FIG. 11 is a partial vertical cross-sectional view of a base unit according to an example modification of a preferred embodiment of the present invention.

FIG. 11 is a partial vertical cross-sectional view of a base unit 4E according to another example modification of a preferred embodiment of the present invention. In FIG. 11, a base member 21E preferably includes a shoulder portion 822E recessed downward. The shoulder portion 822E is arranged in the vicinity of an end portion of a second base upper surface 82E on a side closer to a window portion 70E. The axial dimension of a second gap 92E is thus arranged to increase in the vicinity of an end portion of the second gap 92E on the side closer to the window portion 70E. Thus, even if an adhesive 41E is spread closer to the window portion 70E, the adhesive 41E will be held in the shoulder portion 822E. This preferably contributes to more effectively preventing the adhesive 41E from protruding into the window portion 70E.

Note that the shoulder portion may be arranged in only one of the second base upper surface and the lower surface of the board portion, as long as the shoulder portion causes the axial dimension of the second gap to increase in the vicinity of the end portion of the second gap on the side closer to the window portion. Note, however, that the axial thickness of the connector is smaller than the axial thickness of the bottom plate portion. Therefore, it is easier to define the shoulder portion in the bottom plate portion than in the connector. Also note that the shoulder portion may be arranged in an annular or substantially annular shape to surround the window portion in at least one of the second base upper surface and the lower surface of the board portion. Alternatively, a plurality of shoulder portions may be arranged to surround the window portion with one or more spaces intervening therebetween in at least one of the second base upper surface and the lower surface of the board portion.

Features of the above-described preferred embodiments and the modifications thereof may be combined appropriately as long as no conflict arises.

Preferred embodiments of the present invention is applicable to a base unit, a spindle motor, and a disk drive apparatus, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A base unit for use in a disk drive apparatus into which helium, hydrogen, a gas mixture of helium and hydrogen, or a gas mixture of any one of the above and air is filled, the base unit comprising:
   a base member arranged to support a motor; and
   a connector electrically connected with the motor; wherein
      the base member includes:
         a bottom plate portion arranged to extend in directions perpendicular or substantially perpendicular to a central axis of the motor;

a window portion arranged to extend in an axial direction through the bottom plate portion; and a first groove defined in an upper surface of the bottom plate portion around the window portion;

the connector includes:

a board portion arranged on the upper surface of the bottom plate portion to cover the window portion and the first groove; and an electrode terminal arranged on a lower surface of the board portion;

the electrode terminal is arranged to overlap with the window portion in the axial direction;

an adhesive is arranged between the upper surface of the bottom plate portion and the lower surface of the board portion;

the adhesive is arranged to extend continuously in an annular or substantially annular shape around the window portion; and a portion of the adhesive is arranged in at least a portion of the first groove.

2. The base unit according to claim 1, wherein the first groove is arranged to extend continuously in an annular or substantially annular shape around the window portion.

3. The base unit according to claim 1, wherein a plurality of first grooves are arranged around the window portion with a space intervening therebetween.

4. The base unit according to claim 1, wherein the base member further includes a first base upper surface arranged to extend further outward from an edge portion of the first groove on an outer side with respect to the window portion; and the adhesive is arranged to spread over both an inside of the first groove and a first gap defined between the first base upper surface and the lower surface of the board portion.

5. The base unit according to claim 4, wherein the base member further includes a second groove arranged on the outer side of the first base upper surface; and the adhesive is arranged to further spread over an inside of the second groove.

6. The base unit according to claim 5, wherein the second groove is arranged to extend continuously in an annular or substantially annular shape around the first base upper surface.

7. The base unit according to claim 5, wherein a width of the first groove is greater than a width of the second groove.

8. The base unit according to claim 5, wherein a depth of the first groove is greater than a depth of the second groove.

9. The base unit according to claim 5, wherein each of the first groove and the second groove is arranged in a shape of a letter "V", substantially in a shape of a circular arc, or in a shape of a polygon in a cross-section perpendicular or substantially perpendicular to the first groove and the second groove.

10. The base unit according to claim 4, wherein a total volume of the adhesive is greater than a total volume of the first gap.

11. The base unit according to claim 1, wherein the base member further includes a second base upper surface arranged to extend between the first groove and the window portion; and the adhesive is arranged to spread over both an inside of the first groove and a second gap defined between the second base upper surface and the lower surface of the board portion.

12. The base unit according to claim 11, wherein an axial dimension of the second gap is arranged to gradually increase with decreasing distance from the window portion in an area of an end portion of the second gap on a side closer to the window portion.

13. The base unit according to claim 12, wherein the second base upper surface includes an inclined surface arranged to gradually descend with decreasing distance from the window portion in an area of an end portion thereof on the side closer to the window portion.

14. The base unit according to claim 11, wherein a shoulder portion arranged to increase an axial dimension of the second gap is arranged in the second base upper surface or the lower surface of the board portion in an area of an end portion of the second gap on a side closer to the window portion.

15. The base unit according to claim 11, wherein the second gap is arranged to have a constant or substantially constant axial dimension between the first groove and the window portion.

16. The base unit according to claim 1, wherein the connector includes a plurality of third grooves each of which is arranged to extend in a direction perpendicular or substantially perpendicular to the first groove.

17. A spindle motor comprising:

the base unit of claim 1;

a bearing mechanism fixed to the base unit; and a rotating portion rotatably supported by the bearing mechanism.

18. A disk drive apparatus comprising:

the spindle motor of claim 17;

an access portion arranged to perform at least one of reading and writing of information from or to a disk supported by the rotating portion of the spindle motor; and a cover; wherein the rotating portion and the access portion are accommodated inside a case including the base member and the cover; and an interior of the case is filled with helium, hydrogen, a gas mixture of helium and hydrogen, or a gas mixture of any one of the above and air.

* * * * *